(12) United States Patent
Finley et al.

(10) Patent No.: US 8,723,694 B1
(45) Date of Patent: May 13, 2014

(54) SYSTEM AND METHOD FOR MONITORING HAZARDS ASSOCIATED WITH STATIC CHARGE

(75) Inventors: Jeffery A. Finley, Cedar Rapids, IA (US); Terrence P. Wey, Cedar Rapids, IA (US); Kevin M. Kronfeld, Cedar Rapids, IA (US); Gregory J. Koenigs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 483 days.

(21) Appl. No.: 12/884,040

(22) Filed: Sep. 16, 2010

(51) Int. Cl.
*G08B 23/00* (2006.01)

(52) U.S. Cl.
USPC .................. 340/970; 340/601; 340/691.4

(58) Field of Classification Search
USPC ......... 340/963, 962, 961, 960, 959, 964–973, 340/691.4, 693.5, 981–983, 660, 601
See application file for complete search history.

(56) References Cited

U.S. PATENT DOCUMENTS

| 5,396,220 | A | * | 3/1995 | Markson et al. | 340/600 |
| 5,484,121 | A | * | 1/1996 | Padawer et al. | 244/134 F |
| 5,621,410 | A | * | 4/1997 | Gray et al. | 342/26 D |
| 6,215,294 | B1 | * | 4/2001 | Coleman | 324/72 |
| 7,439,877 | B1 | * | 10/2008 | Jarvinen | 340/962 |
| 7,944,361 | B2 | * | 5/2011 | Anway | 340/601 |
| 8,010,289 | B1 | * | 8/2011 | Ryan et al. | 702/4 |
| 8,410,784 | B1 | * | 4/2013 | Brown et al. | 324/457 |
| 2008/0270052 | A1 | * | 10/2008 | Bernus | 702/65 |

OTHER PUBLICATIONS

Uman, M.A. and Rakov, V.A.; The interaction of lightning with airborne vehicles; Progress in Aerospace Sciences 39; 2003, 21 pages.

* cited by examiner

*Primary Examiner* — Daniel Previl
(74) *Attorney, Agent, or Firm* — Donna P. Suchy; Daniel M. Barbieri

(57) ABSTRACT

A hazard detection system is for use on board an aircraft or other vehicle. The aircraft or other vehicle is disposed in an environment. The hazard detection system includes a circuit for receiving a charge accumulation signal indicative of the electric field associated with the environment. The circuit provides a warning in response to the charge accumulation signal. The warning is indicative of a hazard or potential hazard.

20 Claims, 8 Drawing Sheets

SYSTEM AND METHOD FOR MONITORING HAZARDS ASSOCIATED WITH STATIC CHARGE

BACKGROUND

This disclosure relates to hazard detection and/or warnings. More particularly, this disclosure relates to hazard detection systems and methods associated with charge buildup or static electricity.

Environmental hazards, such as electrically charged atmospheric regions, atmosphere regions containing particles (e.g., particles due to volcanic eruptions), and precipitative atmospheric regions, etc., can pose danger for vehicles. For example, aircraft penetrations through environmental hazards can result in costly damage to the aircraft or aircraft failure due to lightning strikes, ice build-up, and wear on engine parts and other components. It is estimated that as many as 90% of lightning strikes on aircraft are induced by the aircraft itself, especially when the aircraft is flying in the vicinity of the freezing layer. Aircraft induced lightning strikes are accompanied by electrical charge buildup in the aircraft.

Penetration through a volcanic ash cloud, such as the one associated with the Icelandic volcanic eruption, can cause significant damage to an aircraft's engines and flight control systems. In one incident over Alaska, such a penetration resulted in engine failure and replacement of four engines when the aircraft returned to ground.

Penetration of an electrified atmospheric region by aircraft can result in the aircraft being struck by lightning. A lightning charge buildup is often accompanied by precipitation induced static or P-static on aircraft radios due to small electrical discharges from aircraft surfaces. Lightning strikes are extremely costly. When an aircraft is struck by lightning, it is taken out of service for inspection and repair. Both aircraft structural components and electronic components may need to be repaired after a lightning strike.

Thunderstorm penetration by aircraft can result in high altitude icing on aircraft engines. Ice build-up on compressor blades, engine spinners, and internal engine parts results in ice sloughing further into the engine, which can damage the engine or result in engine flame-out. Further, ice build-up can clog pilot tubes and static ports that can cause airspeed, or other cockpit indicator errors.

Accordingly, there is a need for monitoring for environmental hazards. Further, there is a need for an environmental hazard sensor and method of determining the presence of an environmental hazard. There is also a need for a system and method of determining a hazard by sensing an environmental condition. Further, there is a need for a system for a method of determining hazards based on environmental condition that does not require significant additional aircraft components. Yet further there is a need for an onboard hazard detection system which can be integrated with existing avionic equipment onboard the aircraft. Further still, there is a need for a system that can detect the presence of debris clouds associated with environmental hazards, environmental regions with increased probability of lightning strikes, and environmental regions associated with icing, such as, high altitude icing. Yet further still, there is a need for an avionic system that can provide a warning of environmental hazards such as lightning hazards, debris cloud hazards, and icing hazards.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY OF INVENTION

An exemplary embodiment relates to a hazard detection system for use onboard an aircraft. The hazard detection system includes a circuit for receiving a charge accumulation signal indicative of the electric field associated with the environment. The circuit provides a warning in response to the charge accumulation signal. The warning is indicative of a hazard or potential hazard.

Another exemplary embodiment relates to a method providing a warning of a hazard or potential hazard for a vehicle. The method includes steps of receiving a sense signal indicative of charge accumulation on the vehicle and providing the warning in response to the sense signal.

Another exemplary embodiment relates to an apparatus. The apparatus includes means for receiving an indication of an electric field in an environment associated with an aircraft. The apparatus also includes means for providing a warning in response to the indication.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Referring generally to the figures, systems and methods for hazard detection with a vehicle is described. In a preferred embodiment, the hazard detection system is disposed in or with an aircraft-mounted warning system. The hazard detection system can be integrated with a weather radar system (e.g., an avionic weather radar on-board an aircraft), which is generally configured to detect hazards. In one embodiment, hazards can be sensed by detecting the static electricity or charge accumulation on the aircraft. Charge accumulation can be indicative of hazards or potential hazards, such as an environment prone to ice buildup, particle clouds (e.g., from volcanoes), or an environment prone to lightning hazards, etc.

Using sensors, the hazard detection system can determine the presence of static charge buildup on the aircraft and provide a warning of the hazard, or hazard potential. Ice buildup, lightning and particle clouds are often preceded by or are coincident with charge buildup on the aircraft. As the aircraft moves through an environment filled with particulates, charge separation occurs. The aircraft sheds or absorbs electrons from the particulates. Accordingly, negative or positive charge accumulation on the aircraft can be indicative of a hazard. The term "hazard" used herein refers to a hazard or potential hazard.

In a case where the aircraft is moving in a highly charged atmospheric environment, such as thunderstorms, the aircraft acquires a charge due to its impact with ice, water, and graupel. In addition, charge separation within the aircraft structure itself occurs when electrons are pulled in one direction due to attraction by nearby positively-charged cells or similarly repelled in the proximity to negatively-charged cells. When significant charge separation is present within the aircraft due to the proximity of these cells, the aircraft becomes in greater danger of becoming part of a lightning discharge circuit.

Precipitation-induced static electricity or P-Static typically manifests itself through noisy communication signals and St. Elmo's fire. Aircraft designers often attempt to minimize static charges by placing small pointed rods on trailing edges of the aircraft surfaces, e.g., "static wicks" to bleed the charge back into the atmosphere. Similarly, conductive paint or small metal strips are applied to the aircraft realm radome to minimize static build up on non-conductive surfaces where sensitive navigation radio antennas are often located. These efforts can minimize, but do not completely eliminate, the aircraft charge separation experienced in a precipitative environments and volcanic ash environments.

Figure 1:
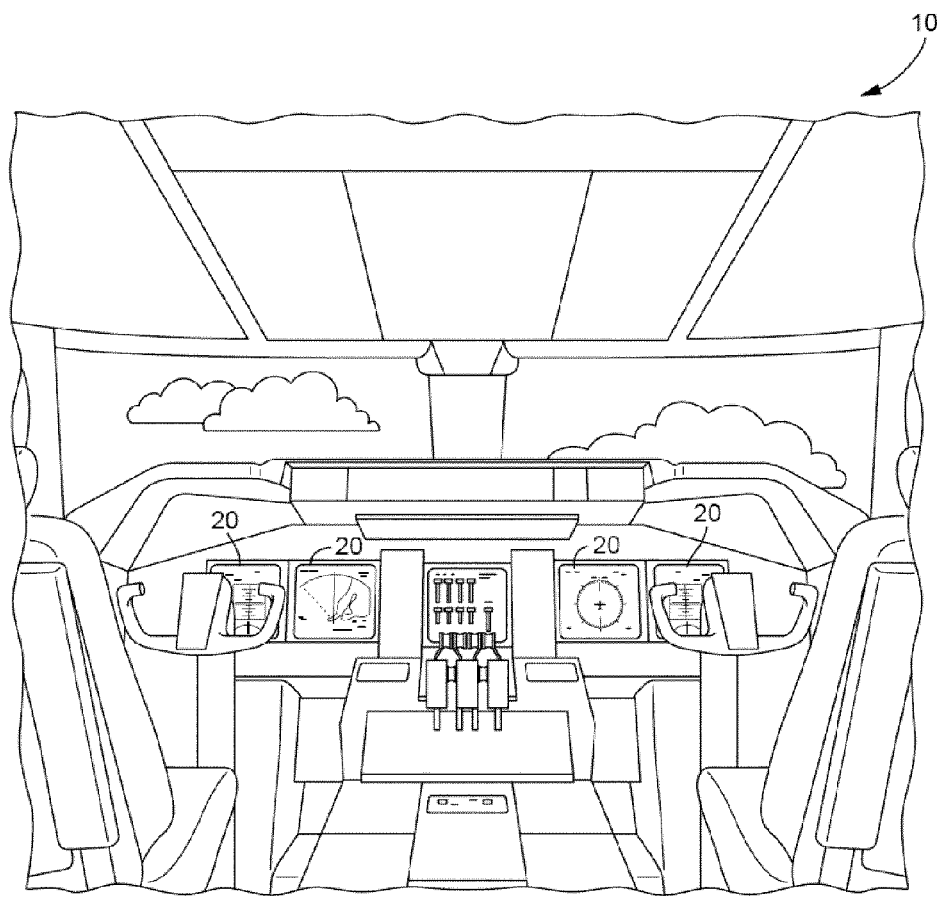
FIG. 1 is a perspective view schematic illustration of an aircraft control center, in accordance with an exemplary embodiment.

Referring now to FIG. 1, an illustration of an aircraft, control center, or cockpit 10 is shown, according to an exemplary embodiment. Aircraft 10 includes flight displays 20 which are generally used to increase visual range and to enhance decision-making abilities. In an exemplary embodiment, flight displays 20 may provide an output from a weather radar system of the aircraft. For example, flight displays 20 may provide a top-down view, a horizontal view, or any other view of weather and/or terrain detected by a radar system on the aircraft. In a preferred embodiment, displays 20 provide an indication of a warning related to the environment. The views of weather and/or terrain may include monochrome or color graphical representations of the weather and/or the terrain. Graphical representations of weather or terrain may include an indication of altitude of those objects or the altitude relative to the aircraft. Aircraft control center 10 may further include terrain awareness and warning system (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

Figure 2:
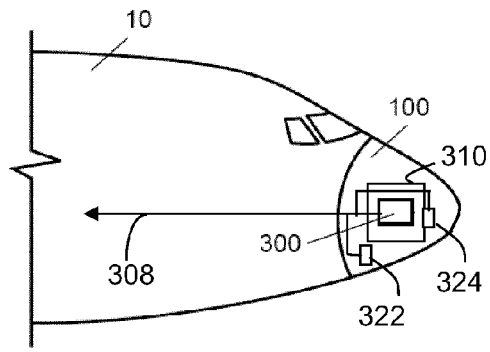
FIG. 2 is a schematic planar side view illustration of the nose of an aircraft including a hazard detection system, in accordance with an exemplary embodiment.

In FIG. 2, the front of aircraft 10 is shown including the control center and a nose 100, according to an exemplary embodiment. A weather radar system 310 (e.g., MultiScan™ system or monopulse radar system) is generally located within nose 100 of aircraft 10 or within the aircraft control center. According to an exemplary embodiment, weather radar system 310 can include or be integrated with a hazard detection system 300. Alternatively, hazard detection system 300 can be a separate unit or separate line replaceable unit (LRU).

System 300 and the method described herein advantageously determine a hazard by detecting static or charge buildup on an aircraft. Hazard detection system 300 can advantageously be integrated with weather radar system 310 which provides a platform for hazard detections and warnings. Weather radar system 310 can be configured to detect hazards associated with P-Static or charge accumulation.

Detecting P-static or electrical charge as an indication of an atmospheric weather hazard fits within the charter for weather radar system 310. Further, the hardware platform associated with system 310 makes it adaptable to receive P-Static sense signals, static detection signals, or other charge accumulation signals and provide a warning to at least one of the displays 20. The term charge accumulation signal refers to an analog signal, digital signal, digital data or other indication of charge build-up, electric field strength, discharge current associated with charge build-up and electric fields, or differences, averages, and combinations thereof.

Software can be utilized to configure weather radar system 310 to provide the warning in response to the detection of static charges or charge accumulation. The use of the weather radar screen on displays 20 associated with weather radar system 310 provides a convenient cockpit display capability for the display of the warning of the hazard due to charge buildup.

In addition, audible and other type of warning capabilities are already present and can be adapted for use with hazard detection system 300. For example, alerting capabilities similar to predictive wind shear alerts associated with system 310 can be utilized. According to various exemplary embodiments, weather radar system 310 and/or system 300 may be located on the top of the aircraft or on the tail of aircraft.

In one embodiment, system 300 can receive charge accumulation signals from sensors 322 and 324 coupled to an input 308. The charge accumulation signals can be provided from electric field detectors, voltage sensors, current sensors or other devices configured to determine charge separation, charge current, or electric field associated with aircraft 10 or the environment surrounding aircraft 10. In one embodiment, sensor 322 and sensor 324 are coupled to input 308 of system 300. Sensors 322 and 324 can provide sense signals indicative of a charge accumulation signal. Alternatively, sensors 322 and 324 can provide a difference signal associated with their sense signals as the charge accumulation signal.

In one embodiment, sensors 322 and 324 are mounted to aircraft 10 to measure charge separation. Sensors 322 and 324 can be transistor-based sensors configured as electric field detectors with sensor 322 mounted on a conductive portion of the radar assembly of system 310 and a sensor 324 mounted on a non-conductive portion associated with the radome of system 310. Such a configuration provides a charge accumulation signal associated with a charge separation aboard aircraft 10. Alternatively, sensors 322 and 324 can be disposed at various locations on aircraft 10 to measure charge separation and thereby provide a charge accumulation signal as described below with reference to FIGS. 4-7.

Radar system 310 may be a WXR-2100 MultiScan™ radar system or similar system manufactured by Rockwell Collins, Inc. configured for hazard determination as described herein in accordance with a preferred embodiment. According to other embodiments, radar system 310 may be an RDR-4000 system or similar system manufactured by Honeywell International, Inc. configured for hazard determination as described herein.

Figure 3:
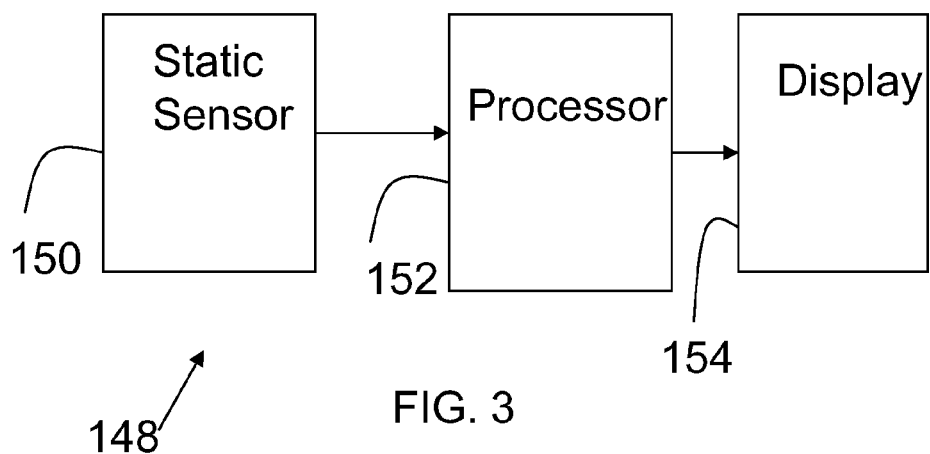
FIG. 3 is a general block diagram of the hazard detection system, in accordance with an exemplary embodiment.

Referring to FIG. 3, a block diagram of a hazard detection system 148 is shown, according to an exemplary embodiment. Hazard detection system 148 can be utilized as hazard detection system 300 shown in FIG. 2. Alternatively, hazard detection system 148 can be a separate unit or integrated with other avionics equipment including TAWS, Flight Management Computer, etc.

System 148 can also include inputs from other sensors or weather radar system 310 and use those inputs to provide the hazard warning. For example, altitude, temperature, humidity, and airspeed could be used in the determination of whether a warning should be provided.

According to a preferred embodiment, system 148 can be utilized to sense aircraft penetration into electrified atmospheric regions associated with volcanic ash clouds, lightning or hazardous icing regions. Hazard detection system 148 includes at least one sensor 150, a processing electronics or processor 152, and a display 154. Sensor 150 can be a single sensor or a number of sensors disposed at various locations throughout aircraft 10 for providing a signal associated with static electric fields or charge accumulation (e.g., a charge accumulation signal). Sensor 150 provides an indication of charge accumulation (e.g., positive or negative) on aircraft 10 and provides a signal to processor 152. Processor 152 receives the signal from sensor 150 and determines whether a hazard exists in response to the charge accumulation signal from sensor 150. In one embodiment, sensor 150 includes sensors 322 and 324 described above with reference to FIG. 2.

Various criteria can be utilized to determine if the charge accumulation signal indicates that aircraft 10 is in an environment associated with a hazard. For example, the charge accumulation signal can be compared to a threshold. If the charge accumulation signal is above a threshold, a warning can be provided from processor 152 to display 154. For example, the threshold can be indicative of a charge buildup of coulombs or a buildup of potential difference of volts or kilovolts according to various embodiments. According to another alternative, processor 152 can store data associated with previously-sampled charge accumulation signals and determine if a hazard is present based upon changes in the environment. For example, rapid changes in charge accumulation signals may indicate a lightning hazard.

Figure 4:
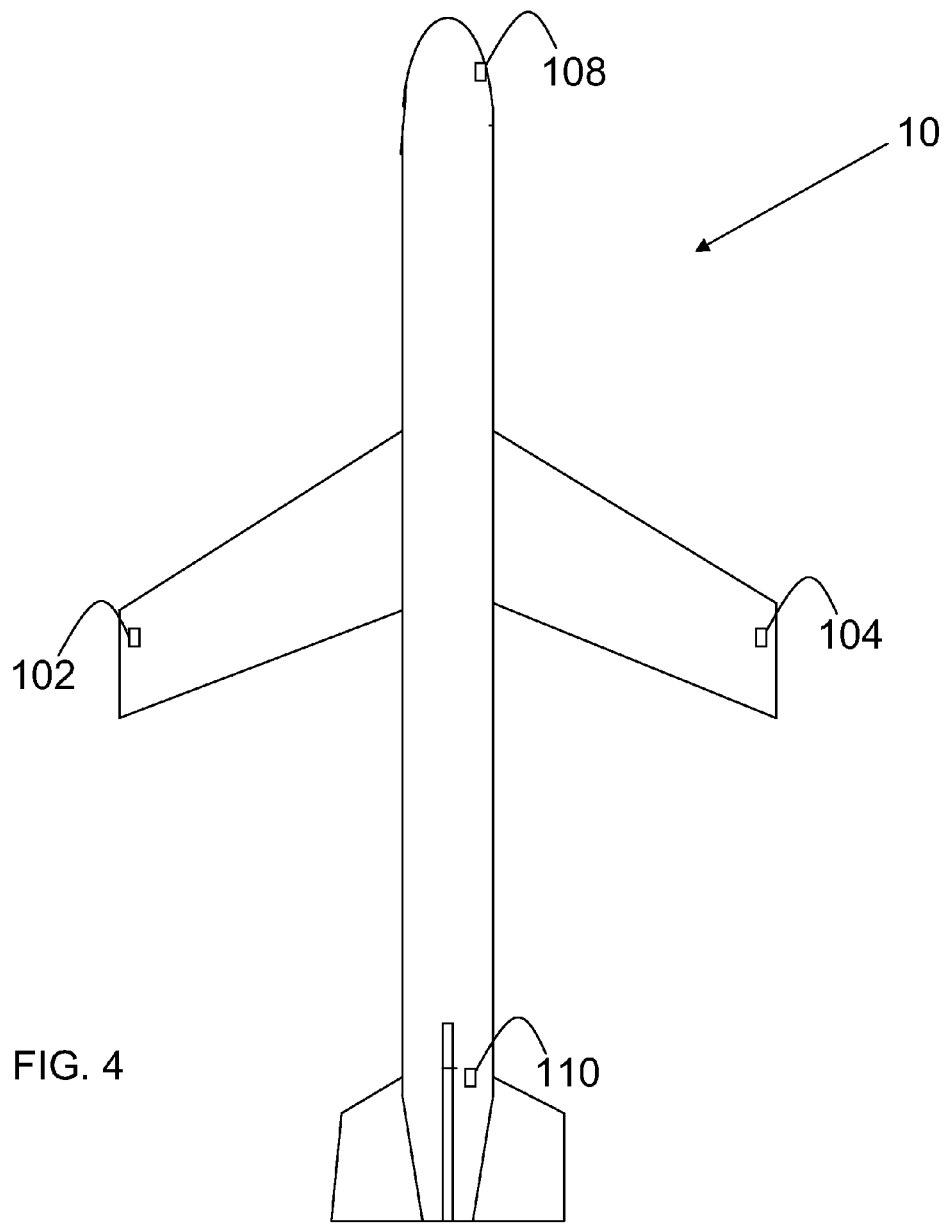
FIG. 4 is a planar top view schematic illustration of an aircraft including electric field detectors for the hazard detection system illustrated in FIG. 3, in accordance with another exemplary embodiment.

With reference to FIG. 4, system 148 can utilize a pair of electric field detectors 108 and 110 and/or a pair of electric field detectors 102 and 104, disposed at different locations on aircraft 10. In one embodiment, detectors 102 and 104 and detectors 108 and 110 can form sensor 150. (FIG. 3) Detectors 102 and 104 are disposed at or near an end of a left wing tip and at or near an end of a left wing tip, respectively. Detector 108 is disposed at or near a front of aircraft 10 and detector 110 is disposed at or near a tail of aircraft 110. Detectors 102 and 104 can indicate a difference in electric field from a left to right of the aircraft, and detectors 108 and 110 can indicate a difference in electric field from a front to back of aircraft. The difference in electric field is an indication of the presence of a lightning producing electrified environment.

Figure 5:
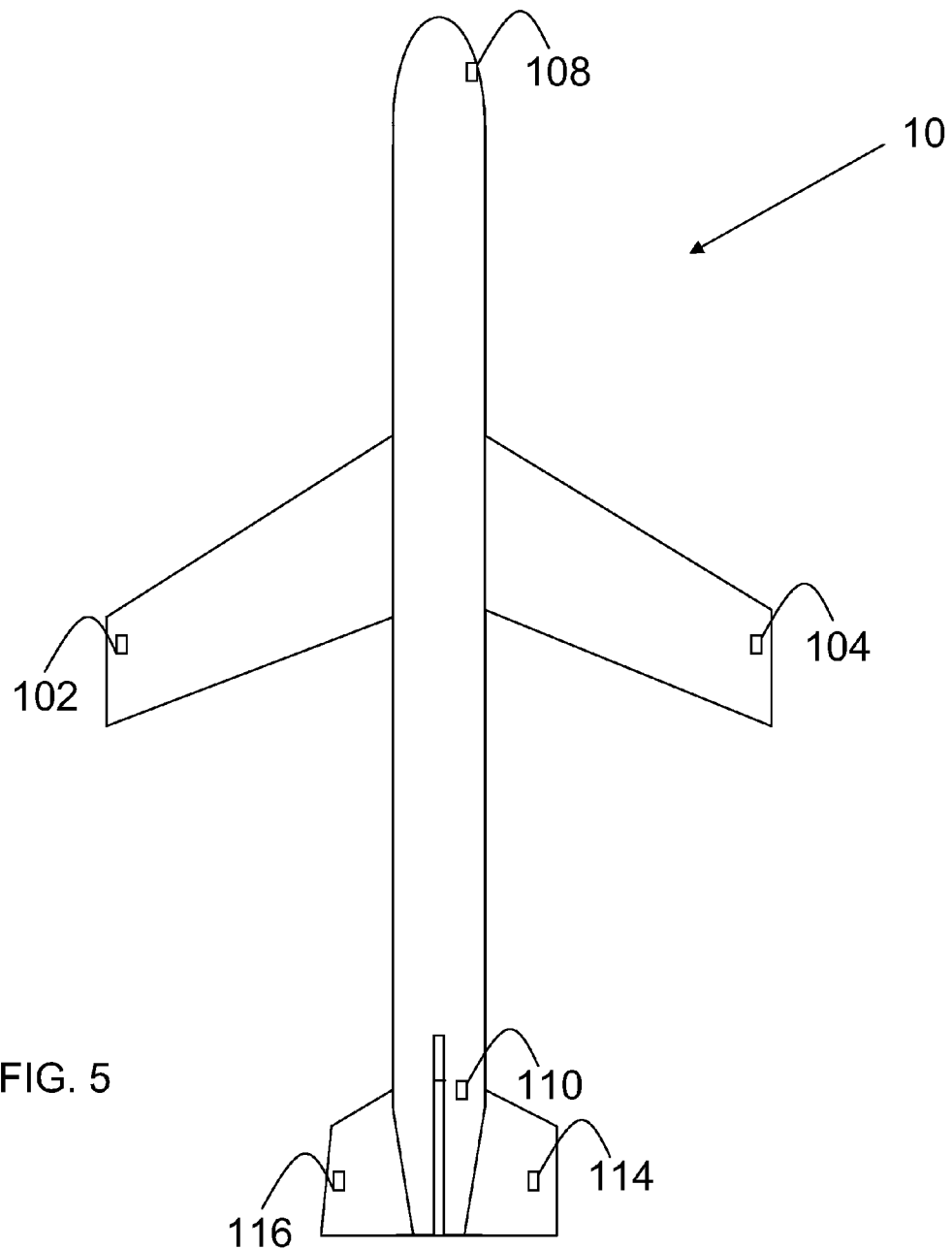
FIG. 5 is a planar top view schematic illustration of an aircraft including electric field detectors for the hazard detection system illustrated in FIG. 3, in accordance with another exemplary embodiment.

The difference in the signals from detectors 102 and 104 or 108 and 110 can be provided as a charge accumulation signal to processor 152. A difference in signals from detectors 102 and 104 and from detectors 108 and 110 is indicative of a hazard according to one embodiment. With reference to FIG. 5, another pair of detectors 114 and 116 can be provided on a tail of aircraft 10.

Figure 7:
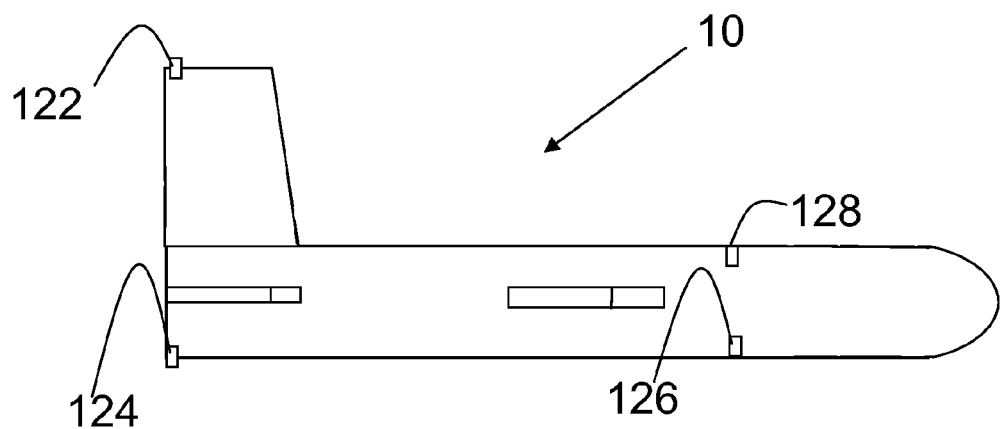
FIG. 7 is a planar side view schematic illustration of an aircraft including electric field detectors for the hazard detection system illustrated in FIG. 3, in accordance with another exemplary embodiment.

With reference to FIG. 7, electric field detectors 126 and 128 are providing on a top and bottom, respectively, of aircraft 10. Detectors 122 and 124 can also be provided at a top and bottom of aircraft 10, respectively, near the tail section of aircraft 10.

As shown in FIG. 5 and FIG. 7, detectors 108, 110, 102, 104, 114, 116, 122, 124, 126, and 128, can be positioned to measure charge separation between wing tips, between nose and tail, between aircraft top and bottom, to measure internal charge separation across various directions. This orientation can be particularly advantageous when determining lighting hazards as aircraft 10 travels between a positively charged thunder cloud and a negatively charged thunder cloud. Travel though such an environment would result in a detectable electrical field by detectors 102, 104, 106, 108, 110, 114, 116, 122, 124, 126, and 128.

Detectors 102, 104, 108, 110, 114, 116, 122, 126, 124, and 128 can be any type of electrometer or other device for measuring static charges or charge accumulation. Detectors 102, 104, 106, 108, 114, 116, 122, 124, 126, and 128 can be any device for measuring electric fields or parameters associated therewith.

Figure 6:
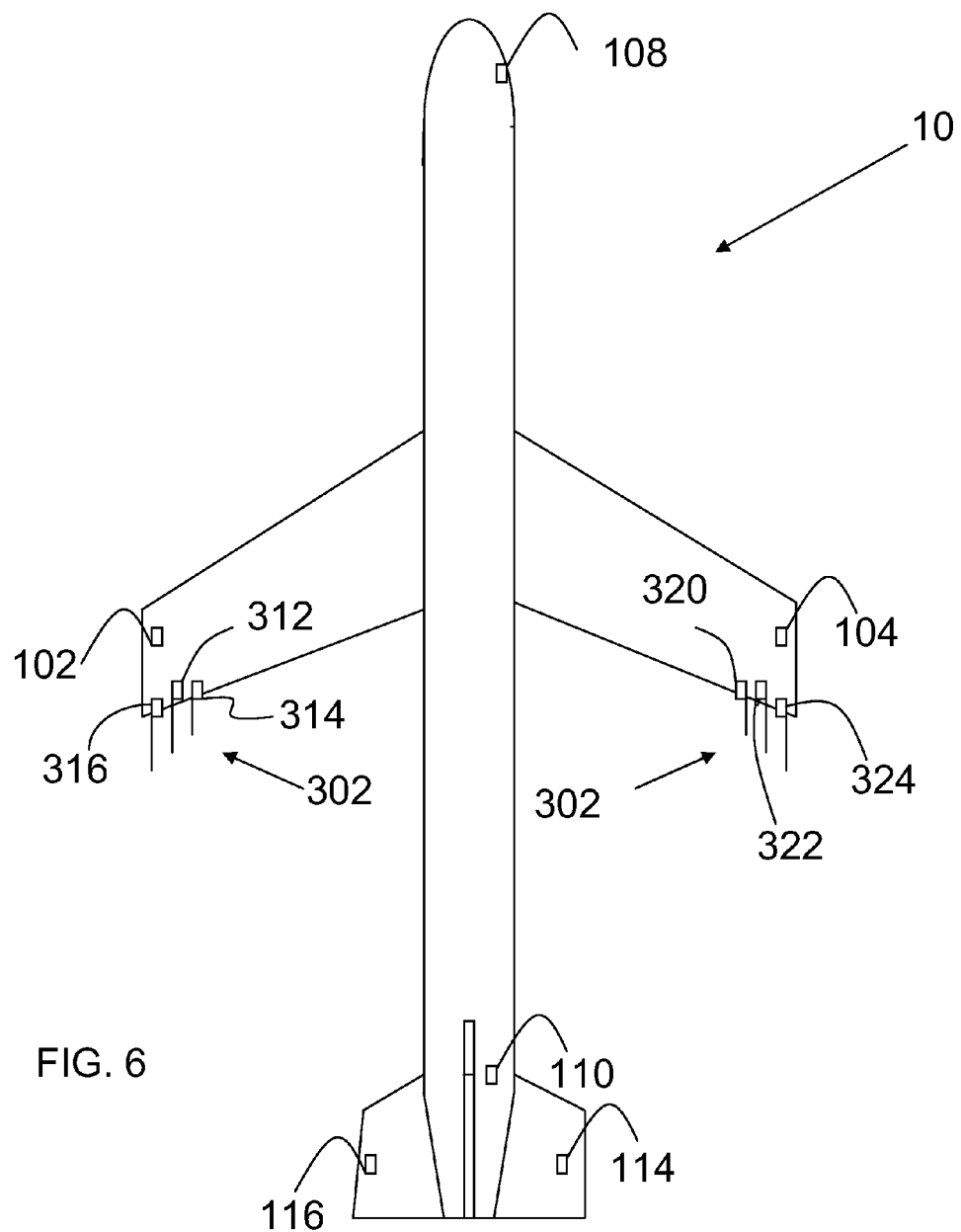
FIG. 6 is a planar top view schematic illustration of an aircraft including electric field detectors and static wick current detectors for the hazard detection system illustrated in FIG. 3, in accordance with another exemplary embodiment.

With reference to FIG. 6, a set 302 of sensors 312, 314, 316, 320, 322, and 324 can be provided on static wicks provided on the trailing edges of aircraft 10. In FIG. 6, wicks are shown on trailing edges of wing tips. However, wicks can be provided on any part of aircraft 10.

Wicks can be conductive rods or other members disposed on aircraft 10. The present invention is not limited to any specific type of wick.

The wicks are coupled to sensors 312, 314 and 316 and sensors 320, 322, and 324. Sensors 312, 314, 316, 320, 322, and 324 can be coupled in series with each wick to measure the current associated with static discharges from each respective wick. The static wick discharge current is indicative of accumulation of charge on aircraft 10. Alternatively sensors 312, 314, 316, 320, 321, and 324 can be coupled in parallel and measure a voltage across the wick or a portion thereof.

Sensors 312, 314, 316, 320, 322, and 324 can be utilized as a set 312 of sensors or as a single sensor 312. For example, aircraft 10 can be utilized with a single sensor coupled to a single wick. Sensors 314, 316, 320, 322, and 324 provide a charge accumulation signal representative of the charge buildup of the aircraft 10 to processor 152.

Sensors 312, 314, 316, 320, 322, and 324 can be utilized with or without detectors 102, 104, 108, 110, 114, and 116. Similarly, detectors 108 and 110 can be utilized without detectors 102, 104, 114, 116, 122, 124, 126, and 128. Detectors 108 and 110 can be utilized without detectors 102, 104, 114, 116, 122, 124, 126, and 128.

In preferred embodiment, detectors 102, 104, 108, 110, 114, 116, 122, 124, 126, and 128 are provided on an outside surface of aircraft 10. Alternatively, sensors 102, 104, 108, 110, 114, 116, 122, 124, 126, and 128 can be provided within aircraft 10 coupled to a conductive or non-conductive part of the aircraft.

Figure 8:
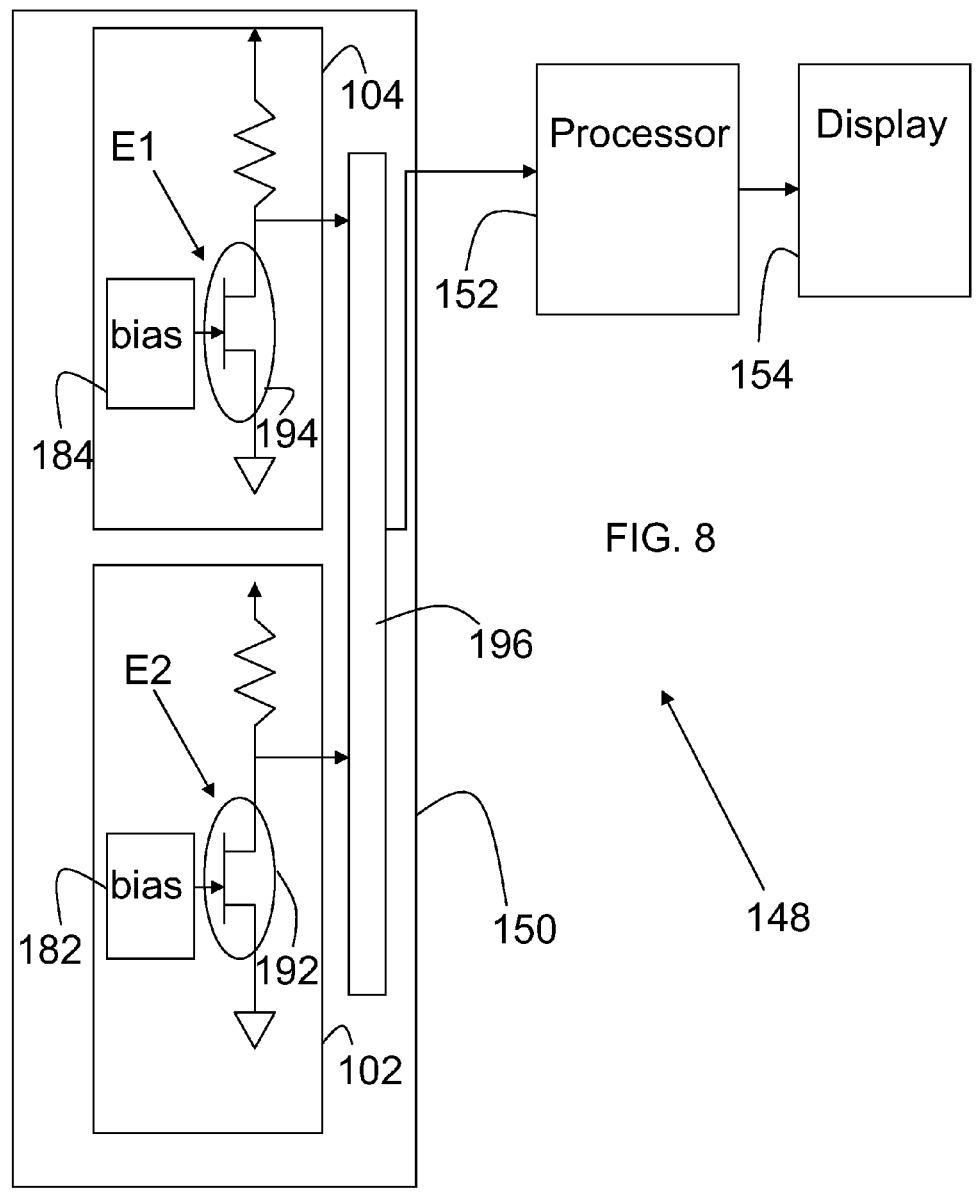
FIG. 8 is a more detailed general block diagram of the hazard detection system illustrated in FIG. 3, in accordance with an exemplary embodiment.

With reference to FIG. 8, system 148 includes sensor 150 embodied as electric field detector 102 and electric field detector 104, according to one exemplary embodiment. Detectors 102 and 104 include transistors 192 and 194, respectively, and bias circuits 182 and 184, respectively. Bias circuits 182 and 184 preferably bias transistors 192 and 194 in a region where changes in external electric fields (E1 and E2) change the output of transistors 192 and 194, respectively. In this way, an increase in external electric fields E1 and E2 results in an increase or decrease are provided in transistor current 192 and 194. The electric field detection signals are provided at the outputs of transistors 192 and 194. In an exemplary embodiment, the transistor current is proportional to the strength of electric field, which is inversely proportional to the electric field detection signal provided at the output. The electric field detection signal is received by a differential circuit 196 which provides an indication of the difference between the signals provided by transistors 192 and 194.

In a preferred embodiment, transistors 192 and 194 are N-channel or P-channel field effect transistors. However, different types of semiconductor devices can be utilized, including diodes, which react to application of external electric fields E1 and E2. In a preferred embodiment, bias circuits 182 and 184 operate transistors 192 and 194 in a mode in which small changes in electric field will provide greater changes of the output. Processor 152 utilizes the differential signal and compares it to a threshold for providing a warning on the display. Alternatively, processor 152 can receive a charge accumulation signal from a single transistor 192.

As discussed with references to FIG. 4-7, detectors 102 and 104 can be mounted on various places on aircraft 10. For example, transistors 192 and 194 can be mounted to an aircraft's radar antenna and the non-conductive radome thereby measuring the difference in field between the conductive assembly and the non-conductive assembly. Alternatively, transistors 192 and 194 can be provided on various wing tips, tail pieces, nose cone pieces, top and bottom, etc.

In one embodiment, transistors 192 and 194 are disposed in an array of transistors having transistor boundaries disposed at various orientations to more optimally sense field strength in various directions. For example, transistors 192 and 194 may be an array of four transistors having transistor boundaries arranged in four different directions. Alternatively, transistor 192 can be an array of transistors having boundaries provided in a single direction. Sensor 150 can include any number of transistors without departing from the scope of the invention.

Figure 9:
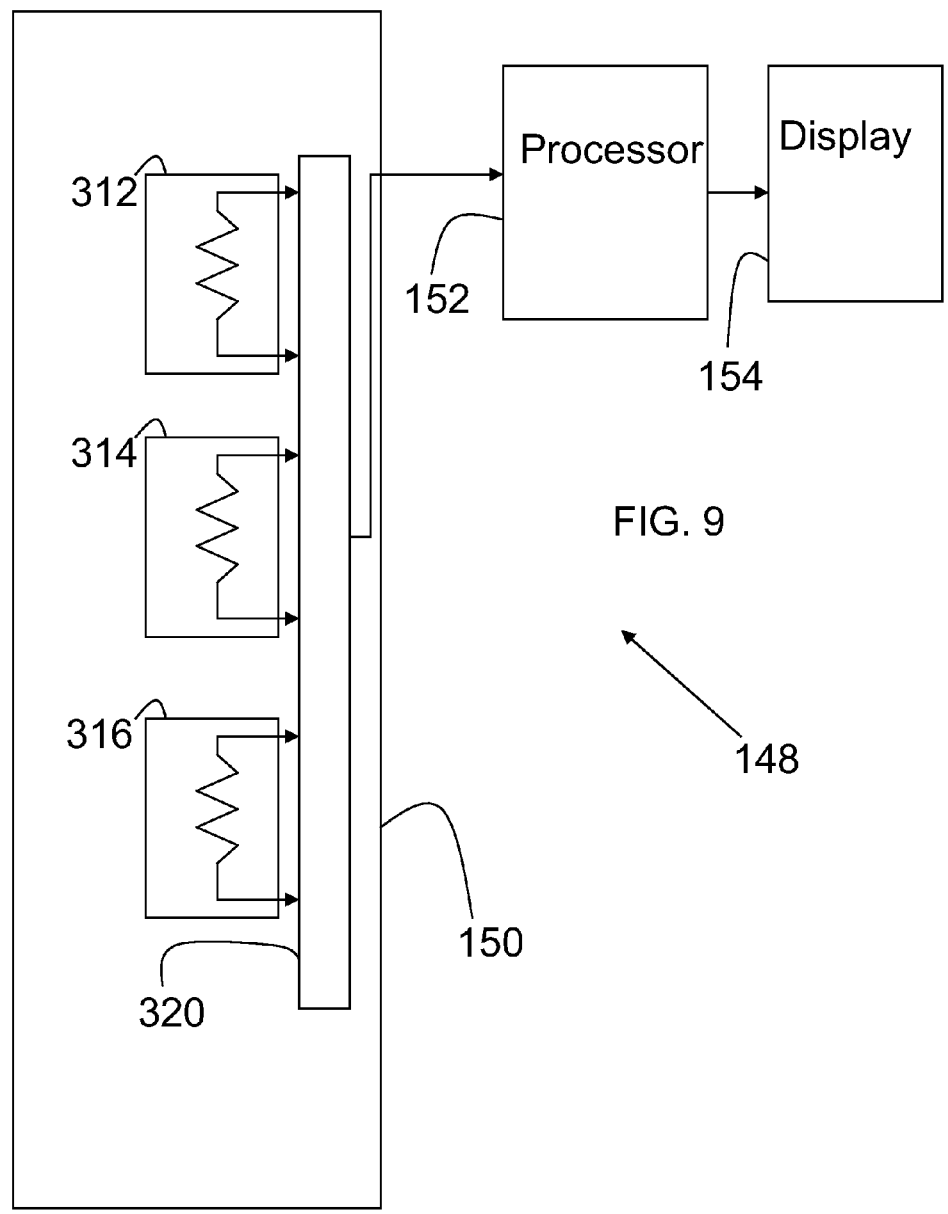
FIG. 9 is a more detailed general block diagram of the hazard detection system illustrated in FIG. 3, in accordance with another exemplary embodiment.

With reference to FIG. 9, system 148 is shown including current sensors 312, 314, and 316 as sensor 150. Sensors 312, 314, and 316 can be embodied as resistive elements or semiconductive elements coupled to a voltage detector. In a preferred embodiment, the elements are coupled in series with aircraft wicks on trailing edges of aircraft 10. The magnitude of the voltage across sensors 312, 314, and 316 indicates the current through the wicks which in turn indicates the charge accumulation on aircraft 10. Alternatively, sensors 312, 314, and 316 can be coupled in parallel with wicks or portions thereof to measure current. Sensors 312, 314, and 316 can be any devices for measuring current discharge from aircraft 10 or electric field associated with aircraft 10.

Circuit 320 is coupled to elements 312, 314, and 316 and serves to provide the signal to processor 152. Circuit 320 can be a multiplexer. Circuit 320 or processor 152 can utilize a signal from sensors 312, 314, and 316, the largest signal from sensors 312, 314, and 316, or average the signals from sensors 312, 314, or 316.

Processor 152 can compare the signal from a circuit 320 or the signals directly from sensors 312, 314, and 316 to a threshold and provide a warning when the threshold is reached. Further, processor 152 can utilize historical samples of the signal and provide a hazard warning in response to changes in the signals.

Processing electronics or processor 152 can be configured to interpret the charge accumulation signal and cause the warning to be provided on a display 154 or one or more of displays 20. The warning can be text, graphic, or audible.

Processor 152 (FIGS. 8 and 9) is preferably configured via software to perform the operations described herein. Processor 152 can be connected to aircraft sensors which may generally include any number of sensors configured to provide data to processor 152. For example, sensors could include temperature sensors, humidity sensors, infrared sensors, altitude sensors, a gyroscope, a global positioning system (GPS), inertial navigation system (INS), altitude and heading reference system (AHRS), or any other aircraft-mounted sensors that may be used to provide data, such as movement data, to processor 152. It should be appreciated that sensors (or any other component shown connected to processor 152) may be indirectly or directly connected to processor 152. Processor 152 further be connected to avionics equipment. Avionics equipment can include a flight management system, INS, AHRS, a navigation system, a backup navigation system, or another aircraft system configured to provide inputs to processor 152.

Figure 10:
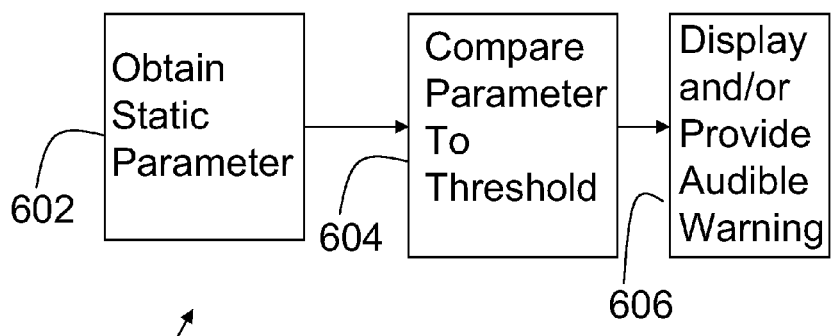
FIG. 10 is a flow chart of a process for providing a warning using the hazard detection system illustrated in FIG. 3, in accordance with an exemplary embodiment.

With reference to FIG. 10, operation of system 148 is described as follows according to a method 600. At a step 602, a static parameter is obtained. The static parameter can be a charge accumulation signal representative of the detected electric field, such as a signal from electric field detectors 182 and 184, from current sensing elements 312, 314, and 316, or any combination thereof. At a step 604, processor 152 compares the signal representing the static accumulation aboard aircraft 10 to a threshold and displays a warning and/or provides an audible warning at a step 606. System 138 can provide a textual, graphical, or aural indication of the charge accumulation on aircraft 10.

Figure 11:
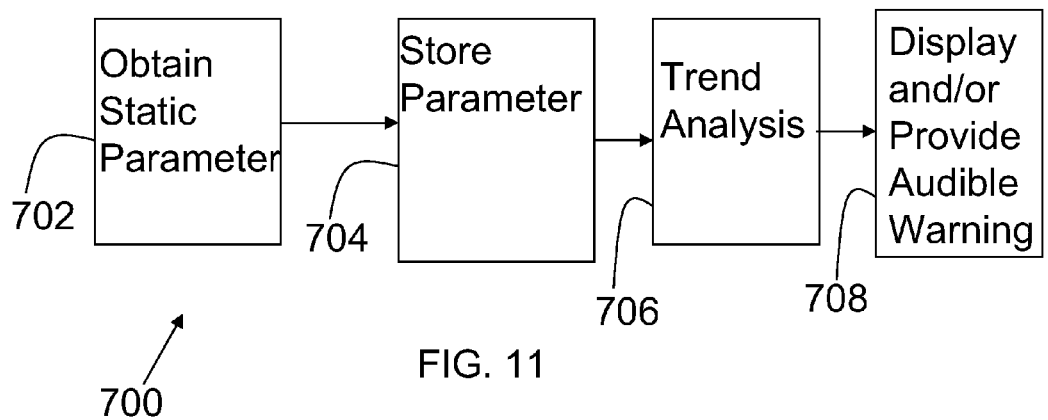
FIG. 11 is a flow chart of a process for providing a warning using the hazard detection system illustrated in FIG. 3, in accordance with another exemplary embodiment.

With reference to FIG. 11, operation of system 148 is described according to a method 700. System 148 obtains a static parameter (e.g. the charge accumulation signal) at a step 702 and stores the static parameter at a step 704. System 148 can utilize trend analysis at a step 706 to determine changes over time associated with the static parameter and display a warning and/or provide an audible warning at a step 708 in response to those changes. Various processing techniques can be utilized to determine changes in the parameter. System 148 can utilize both the process of 600 and 700 in parallel to determine if a warning should be displayed.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

While the detailed drawings, specific examples, and particular formulations given describe preferred and exemplary embodiments, they serve the purpose of illustration only. The inventions disclosed are not limited to the specific forms shown. For example, the various functions may be performed in any of a variety of sequence steps, or by any of a variety of hardware and software combinations. The systems and methods depicted and described are not limited to the precise details and conditions disclosed. Furthermore, other substitutions, modifications, changes, and omissions may be made in the design, operating condition and arrangements and be exemplary embodiments without departing from the scope of the invention as expressed in the appended claims.

What is claimed is:

1. A hazard detection system for use on-board an aircraft in an environment, the hazard detection system comprising:
    a first sensor mounted on a conductive portion of the aircraft;
    a second sensor mounted on a non-conductive portion of the aircraft, the conductive portion being remote from the non-conductive portion, the first conductive portion being associated with a radar assembly of the aircraft and the non-conductive portion being associated with a radome of the aircraft, wherein the first sensor is distinct from the second sensor; and
    a circuit for receiving a first sensor signal from the first sensor and a second sensor signal from the second sensor and providing a charge accumulation signal indicative of charge buildup on the aircraft in response to the first sensor signal and the second sensor signal and providing a warning in response to the charge accumulation signal, the warning being indicative of a hazard or potential hazard.

2. The hazard detection system of claim 1, further comprising a wick sensor configured to be disposed on the aircraft and wherein the wick sensor is configured to sense current through at least one static wick disposed on the aircraft and the circuit uses the sensed current to provide the charge accumulation signal.

3. The hazard detection system of claim 2, wherein the wick sensor includes an ammeter.

4. The hazard detection system of claim 2, wherein the first sensor includes a semiconductor device configured to provide a first sense signal in response to electric field.

5. The hazard detection system of claim 1, wherein the first and second sensors include at least one electric field detector.

6. The hazard detection system of claim 1, further comprising: a third sensor comprising a first electric field detector comprising a first semiconductor device configured to be biased in a region where changes in an external electric field near the third sensor results in a change in current provided by the first semiconductor device and a fourth sensor comprising a second electric field detector comprising a second semiconductor device configured to be biased in a region where changes in an external electric field near the fourth sensor results in a change in current provided by the second semiconductor device, wherein the circuit receives signals from the third sensor and the fourth sensor indicative of the current provided by the first semiconductor device and the second semiconductor device.

7. The hazard detection system of claim 1, wherein the charge accumulation signal is related to a difference between the first sensor signal from the first sensor and the second sensor signal from the second sensor.

8. The hazard detection system of claim 1, wherein the circuit includes a processor and stores data associated with the value of the charge accumulation signal and provides the warning in response to the data, wherein the warning is a lightning warning and the warning is provided when the data indicates a significant change over time.

9. The hazard detection system of claim 1, further comprises:
    a display coupled to the circuit for displaying the warning.

10. The hazard detection system of claim 1, wherein the circuit is part of a weather radar system.

11. A method of providing a warning of hazard or potential hazard for a vehicle, the method comprising:
    receiving a first sensor signal from a first sensor mounted on a non-conductive portion of the vehicle;
    receiving a second sensor signal from a second sensor mounted on a conductive portion of the vehicle, the first conductive portion being associated with a radar assembly of the vehicle and the non-conductive portion being associated with a radome of the vehicle, wherein the first sensor is distinct from the second sensor;
    providing a charge accumulation signal indicative of charge accumulation on the vehicle in response to the first sensor signal and the second sensor signal; and
    providing the warning in response to the charge accumulation signal.

12. The method of claim 11, further comprising using previous values of the charge accumulation signal when providing the warning on the vehicle, wherein the warning is a lightning warning and the warning is provided when the previous values indicate a significant change over time.

13. The method of claim 11, wherein the vehicle is an aircraft.

14. The method of claim 13, wherein the hazard is a high altitude, precipitative environment, a debris cloud, or lightning.

15. The method of claim 11, wherein a third sensor signal is indicative of current through a wick disposed on an aircraft and is used to provide the charge accumulation signal, wherein the vehicle is the aircraft.

16. The method of claim 11, wherein the charge accumulation signal is a difference signal associated with the non-conductive portion and the conductive portion, the non-conductive portion being on the radome and the conductive portion being on the radar assembly, the radar assembly being a weather radar assembly.

17. An apparatus, comprising:
    means for receiving an indication of electric field in an environment associated with an aircraft, wherein the means for receiving receives a first sensor signal from a first sensor mounted on a non-conductive portion of the aircraft and a second sensor signal from a second sensor mounted on a conductive portion of the aircraft and provides the indication in response to the first sensor signal and the second sensor signal, the first conductive portion being associated with a radar assembly of the aircraft and the non-conductive portion being associated with a radome of the aircraft; and
    means for providing a warning in response to the indication.

18. The apparatus of claim 17, wherein the means for receiving includes an electric field detector.

19. The apparatus of claim 17, wherein the means for providing compares the indication to a threshold.

20. The apparatus of claim 17, wherein the means for providing includes a display.

\* \* \* \* \*